United States Patent [19]
Sadri

[11] Patent Number: 5,178,502
[45] Date of Patent: Jan. 12, 1993

[54] HIGH STRENGTH BLIND BOLT
[75] Inventor: Shahriar M. Sadri, El Torro, Calif.
[73] Assignee: Huck International, Inc., Irvine, Calif.
[21] Appl. No.: 705,447
[22] Filed: May 24, 1991
[51] Int. Cl.$^5$ ................................ F16B 19/00
[52] U.S. Cl. .................................... 411/361; 411/43
[58] Field of Search .............. 411/55, 43, 54, 34, 411/35, 36, 37, 38, 70, 39, 44, 361, 501, 373, 371; 403/408.1; 52/731, 584

[56] References Cited

U.S. PATENT DOCUMENTS

| | | | |
|---|---|---|---|
| 2,061,629 | 11/1936 | Huck | 411/70 X |
| 2,099,678 | 11/1937 | Curtis | 411/55 X |
| 2,114,493 | 4/1938 | Huck . | |
| 2,282,711 | 5/1942 | Eklund . | |
| 2,527,307 | 10/1950 | Huck . | |
| 2,765,699 | 10/1956 | La Torre | 411/43 |
| 2,795,989 | 6/1957 | Koenig . | |
| 2,887,003 | 5/1959 | Brilmyer . | |
| 2,905,045 | 9/1959 | Vance | 411/70 |
| 3,107,572 | 10/1963 | Orloff . | |
| 3,129,630 | 4/1964 | Wing et al. . | |
| 3,136,204 | 6/1964 | Reynolds . | |
| 3,202,036 | 8/1965 | Simko . | |
| 3,222,977 | 12/1965 | Vaughn . | |
| 3,262,353 | 7/1966 | Waeltz et al. . | |
| 3,277,771 | 10/1966 | Reynolds . | |
| 3,311,147 | 3/1967 | Walker . | |
| 3,345,900 | 10/1967 | Villo . | |
| 3,377,907 | 4/1968 | Hurd . | |
| 3,643,544 | 2/1972 | Massa | 411/43 |
| 3,657,956 | 4/1972 | Bradley et al. . | |
| 3,786,612 | 1/1974 | Baker | 403/295 |
| 3,878,760 | 4/1975 | Jeal et al. . | |
| 4,089,247 | 5/1978 | Dahl et al. . | |
| 4,168,650 | 9/1979 | Dahl et al. . | |
| 4,203,346 | 5/1980 | Hall et al. . | |
| 4,289,060 | 9/1981 | Emmett . | |
| 4,289,061 | 9/1981 | Emmett . | |
| 4,312,613 | 1/1982 | Binns . | |
| 4,363,697 | 12/1982 | Binns . | |
| 4,370,081 | 1/1983 | Briles . | |
| 4,376,604 | 3/1983 | Pratt et al. . | |
| 4,451,189 | 5/1984 | Pratt . | |
| 4,457,652 | 7/1984 | Pratt . | |
| 4,579,491 | 4/1986 | Kull . | |
| 4,627,775 | 12/1986 | Dixon . | |
| 4,659,271 | 4/1987 | Pratt et al. . | |
| 4,659,272 | 4/1987 | Pratt . | |
| 4,699,552 | 10/1987 | Jeal . | |
| 4,752,169 | 6/1988 | Pratt . | |
| 4,772,167 | 9/1988 | Beals . | |
| 4,813,834 | 3/1989 | Smith . | |
| 4,815,906 | 3/1989 | Binns | 411/69 X |
| 4,832,548 | 5/1989 | Strobel . | |
| 4,865,499 | 9/1989 | Lacey | 411/34 |
| 4,867,625 | 9/1989 | Dixon . | |
| 4,877,363 | 10/1989 | Williamson et al. . | |
| 4,900,205 | 2/1990 | Sadri . | |
| 4,919,577 | 4/1990 | Binns . | |
| 4,921,384 | 5/1990 | Nordyke . | |
| 4,950,115 | 8/1990 | Sadri | 411/38 |
| 5,006,024 | 4/1991 | Siebol . | |

FOREIGN PATENT DOCUMENTS 1300950  7/1962  France .................................. 411/54

OTHER PUBLICATIONS

The Huck BOM® Fastening System, High strength blind fasteners for structural applications, ©1987 Huck Manufacturing Company; Tau Bolt® Fastener, Carbon, Apr. 1987.
Steel 3BL, Huck Manufacturing Company; Tau Bolt® Fastener, Alloy Steel BL, Huck Manufacturing Company.

Primary Examiner—Rodney M. Lindsey
Attorney, Agent, or Firm—Harness, Dickey & Pierce

[57] ABSTRACT

A high strength blind bolt for fastening structural workpieces the blind bolt being of a swage type, pull type construction and having a pin member with a plurality of locking grooves, a main sleeve, an expandable sleeve and a collar adapted to be swaged into the lock grooves, the main sleeve having a tapered nose portion adapted to radially expand the expandable sleeve in response to the application of a preselected relative axial force applied between the pin member and the collar, the tapered nose portion being defined by a preselected small angle to limit the radial expansion of the expandable sleeve to provide a high strength blind head for engaging the adjacent, blind side of the structural workpieces and to initially clamp the structural workpieces together at a high clamp load and to provide a final high, residual clamp load upon swaging of the collar into the lock grooves of the pin member.

20 Claims, 9 Drawing Sheets

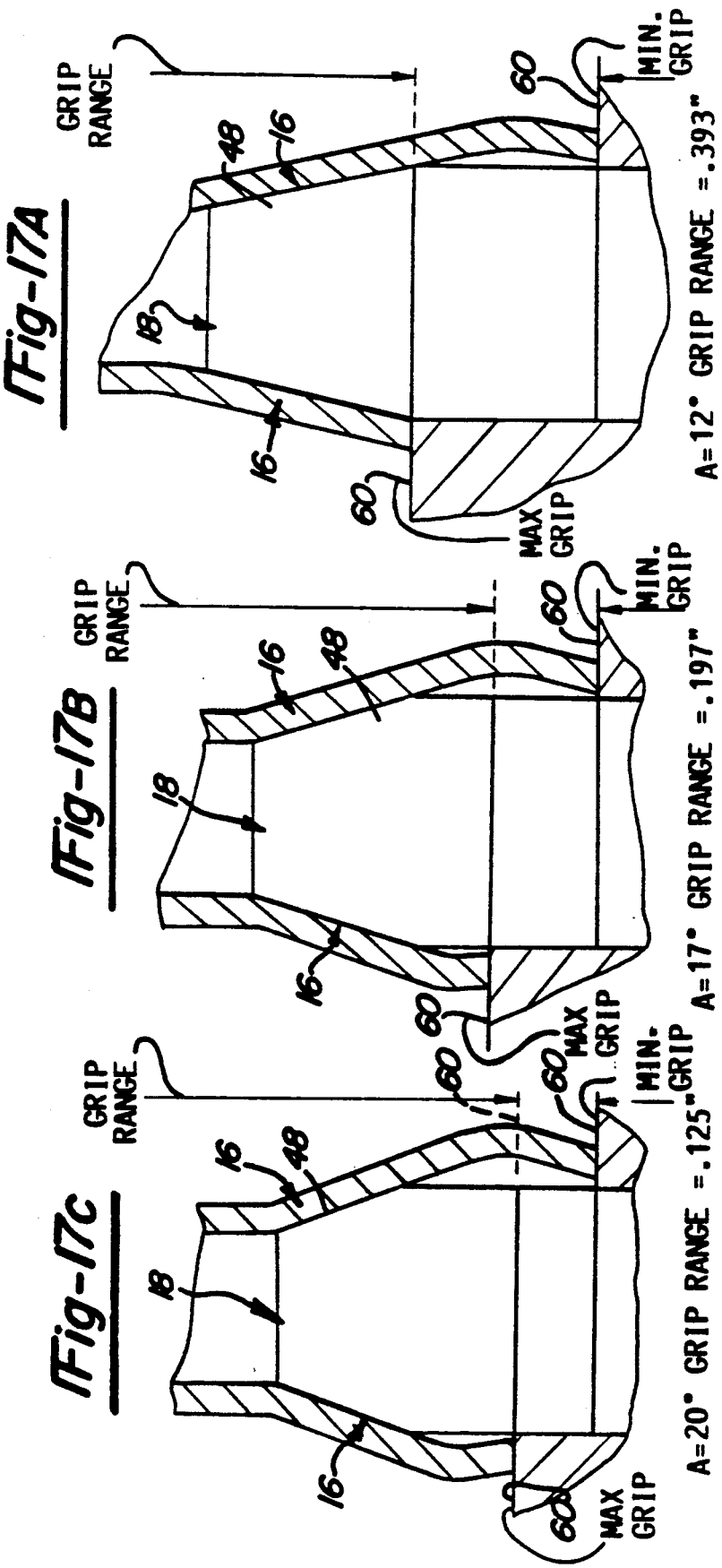

HIGH STRENGTH BLIND BOLT

SUMMARY BACKGROUND OF THE INVENTION

The present invention relates to multi-piece fasteners and more particularly to a high strength blind bolt using a lockbolt like swaged construction and providing a high final clamp load of workpieces secured together and further relates to such blind fasteners particularly adapted for constructions utilizing box beams or columns, bridges and the like.

The present invention relates generally to multi-piece blind bolt fasteners which include a main sleeve, an expandable sleeve and a pin wherein the expandable sleeve is moved axially relative to the main sleeve and is expanded radially thereover in response to a relative axial force applied via the pin. In this regard the blind bolt of the present invention bears a general resemblance to a threaded blind fastener of the type shown in U.S. Pat. No. 3,643,544 issued Feb. 22, 1972 to Joseph H. Massa; fasteners of this type have been sold under the trade name Visu-Lok and/or Jo-Bolt by the Voi-Shan Manufacturing Company of the United States. See also U.S. Pat. No. 3,262,353 issued Jul. 26, 1966 to R. Waeltz et al, U.S. Pat. No. 2,765,699 issued Oct. 9, 1956 to J. LaTorre, U.S. Pat. No. 2,887,003 issued May 19, 1959 to Brilmeyer and U.S. Pat. No. 3,107,572 issued Oct. 22, 1963 to Orloff.

In the present invention the high strength blind bolt includes a collar which cooperates with the pin in the manner of a swage type fastener such that, after the blind head has been formed, the application of a relative axial force of increasing magnitude between the pin and collar causes an installation tool to swage the collar into lock grooves in the pin. In this regard U.S. Pat. No. 2,114,493 issued Apr. 19, 1938 to L. C. Huck and U.S. Pat. No. 2,527,307 issued Oct. 24, 1950 to L. C. Huck generally show a swage type connection between the pin and sleeve of a blind fastener.

The high strength fastener of the present invention can advantageously utilize the collar design of U.S. Pat. No. 4,921,384 for Swage Fasteners With A High Stand-Off Collar by Keith Nordyke and issued May 1, 1990. In addition the present invention could utilize the groove shape and concepts of U.S. Patent application Ser. No. 185,327 by Richard D. Dixon for High Strength Fastener and Method filed on Apr. 20, 1988. All of the above patents and noted patent application of Dixon can be considered as prior art relative to the present invention.

The high strength fastener of the present invention includes a pin, an expandable or primary sleeve, a main or secondary sleeve, and a collar adapted to be swaged into lock grooves in the pin in response to a preselected relative axial force applied between the pin and collar. In the present invention the collar initially transmits an axial force from the swage anvil of the setting tool to the main sleeve. The pin has an enlarged head which transmits an opposite axial force against the expandable sleeve by virtue of a pulling force exerted by the tool. As the axial force increases the expandable sleeve is moved axially relative to a tapered nose portion at the blind side of the main sleeve and is radially expanded to overengage that end of the main sleeve. The axial movement and radial expansion of the expandable sleeve continues until the resultant blind head is moved into engagement with the blind side surface of the workpieces to be fastened. Now the workpieces are pulled together by the further application and increase in the relative axial pulling force. The force clamping the workpieces together continues to increase until the collar is swaged into the lock grooves on the pin. The final clamp load on the workpieces can be determined first by an initial magnitude of relative axial force attained just before the collar starts to be swaged onto the pin and thereafter by elongation of the collar in response to swage. The initial axial clamp force on the workpieces is sometimes referred to as "pre-load" while the final clamping force after full swage is referred to as "final clamp load". The beginning of swaging at this pre-load is sometimes referred to as "primary clinch".

The high strength blind bolt of the present invention is adapted for use in applications in which high strength bolts, such as SAE Grade 5 (ASTM A325) or higher, are frequently used. It is also desirable for use where blind welding, nut plates and other complex construction fastening systems are used. In this regard, the blind fastener of the present invention is especially suited for construction of buildings, bridges, and the like where high strength and durability are of considerable importance along with the capability of providing high clamp loads of the assembled parts. Thus the blind bolt of the present invention has a high tensile strength such as SAE Grade 5 or greater and/or the tensile strength of the Japanese Grade F8T bolt or greater. This is accomplished, in part, by the use of high strength ferrous materials having a high hardness. With such materials, factors such as notch sensitivity, stress corrosion and the like can become more significant especially with a pin of high hardness. In the present invention these factors are addressed by a unique balancing of the strengths, materials and configuration of the individual components. In addition the effects of stress corrosion on the high hardness pin are inhibited by self sealing features protecting the highly stressed portions of the pin from exposure and/or access to the atmosphere.

Thus in many applications it is desirable to provide a high level of final clamp load in the fastened joint. This can be a problem unless a blind head is formed which will retain its integrity in response not only to a pre-load of high magnitude but also to the subsequent desired final clamp load. Thus in the present invention it is also desirable that a high strength blind head be formed to sustain the high pre-load and subsequent high final clamp load. But this poses an additional problem since the application of the necessary relative axial force of substantially high magnitude to attain the high pre-load requires the collar to have a high hold-off capability to resist the initiation of swage. In these cases the relative geometries of the swage anvil and engaging end of the collar are selected to provide hold-off or stand-off of initial swage until the desired pre-load value is attained.

The blind bolt of the present invention utilizes the unique collar construction of the '384 Nordyke patent (supra) for providing a blind bolt swage type fastener having a high stand-off capability while providing generally equal groove fill in the pin and minimizing localized pin distortion.

In one form of the invention, the wall thickness of the expandable sleeve is maximized to thereby increase the strength of the formed blind head. As will be seen, this is accomplished by a unique assembly and manufacturing procedure.

In some applications it may be desirable to provide a pin and collar combination in which there is a predetermined amount of "overpack". Overpack occurs where the volume of collar material to be swaged in the pin lock grooves is greater than the available volume defined by the confronting volume of the cavity of the swage anvil and the pin lock grooves. The pin and collar construction of the present invention provides for a more uniform overpack condition over its swageable length.

In one form of the invention, the lock grooves of the pin are in the form of a helical male thread. In such case the collar can be provided with a mating, female thread of a preselected extent such that the initial pre-assembly of the fastener components can be accomplished. The female collar thread is selected such that, in response to the relative axial force and at a level prior to the initiation of collar deformation or swaging (primary clinch) into the lock grooves of the pin, it will shear or deform such that the collar will be free to move axially over the pin and to respond to the installation loads in the same manner as a collar without such female thread form. In this regard a construction could be utilized such as that shown in U.S. Pat. No. 4,867,625 by Richard Dixon for Variable Clamp Fastener and Method issued Sep. 19, 1989. Similarly, a construction could be used such as that shown in the U.S. Patent to Walter Smith U.S. Pat. No. 4,813,834, issued Mar. 21, 1989. Both of the latter patents can be considered as prior art to the present invention.

In some applications it is desirable that the fasteners have a high strength, high performance characteristic both in clamp up and in fatigue. In this latter regard then, it may be advantageous to utilize the groove shape and concepts of the invention of the '327 application of Dixon.

Thus, in one form of the present invention, the lock grooves in the pin are very shallow and are constructed to have roots of a simulated streamlined shape. The lock grooves are helical and define a desired thread configuration. The shallow grooves and simulated streamlined shape, however, provide a resultant fatigue life which is superior to that of a comparable threaded fastener. Since the preceding construction is shown and described in the noted '327 application of Dixon and since the present invention is not restricted to such a construction the details thereof, while incorporated by reference, have been omitted for purposes of simplicity.

The high strength fastener of the present invention may be utilized in applications where the hole sizes in the workpieces may be somewhat oversized or in applications where the material at the blind side of the workpieces is relatively soft and subject to deformation. Another form of the invention addresses such conditions by using an additional sleeve having a relatively thin wall and hence which is adapted to readily collapse around the blind side opening to thereby inhibit movement or extrusion of the expansion sleeve into an oversized hole and/or inhibit deformation of the blind side surface of a workpiece made of a soft material.

Thus it is a general object of the present invention to provide a novel high strength blind bolt having a swage type construction.

It is another object of the present invention to provide a unique blind bolt construction for forming a high strength blind fastener having a high strength blind head.

It is still another object of the present invention to provide a unique blind bolt construction for forming high strength blind fasteners having a high strength head and including a swage type construction utilizing a collar having a high stand-off capability.

Other objects, features and advantages of the present invention will become apparent from the subsequent description and the appended claims, taken in conjunction with the accompanying drawings, in which:

Figure 16A:
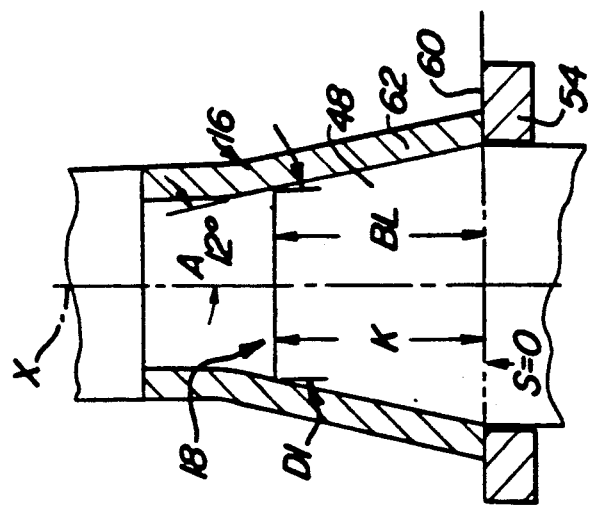
Figure 16B:
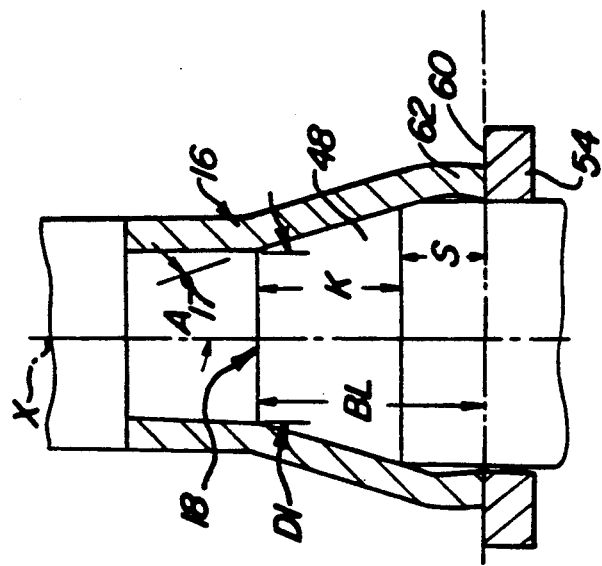
Figure 16C:
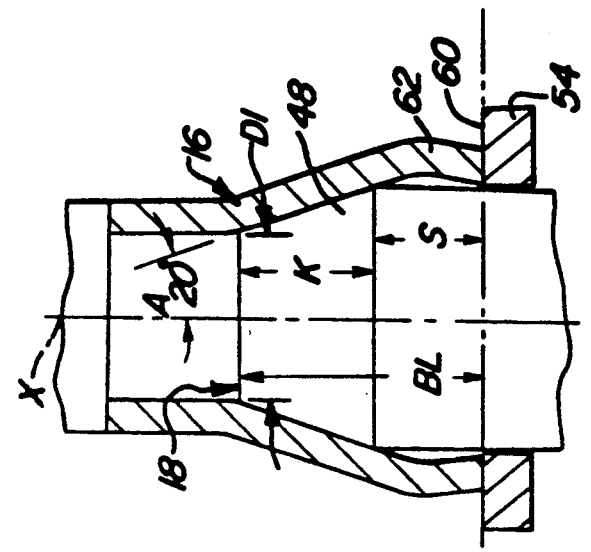

FIGS. 16A-C are enlarged fragmentary views of the fastener of the present invention depicting the amount of blind side protrusion required to properly form the blind head for nose angles on the main sleeve of 12°, 17° and 20°, respectively for a maximum grip condition; and FIGS. 17A-C are enlarged fragmentary views of the fastener of the present invention depicting the differences in grip range capability of fasteners having nose angles on the main sleeve of 12°, 17° and 20°, respectively, with the minimum grip condition shown on the right side and maximum grip condition shown on the left side of each view.

Figure 1:
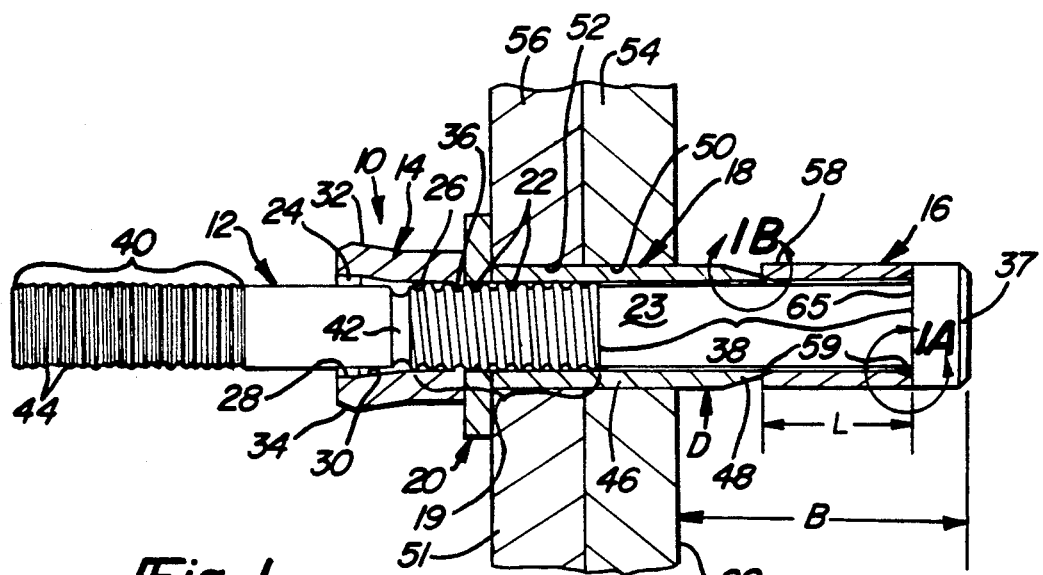
FIG. 1 is a longitudinal view with some portions shown in section of a blind fastener of the present invention including a pin, a collar, a primary or expansion sleeve, a secondary or main sleeve and hold-off washer in assembly relationship with workpieces to be secured together.

Looking now to FIG. 1, a blind fastener 10 includes a pin 12, a tubular collar 14, a primary or expansion sleeve 16, a secondary or main sleeve 18 and a hold-off washer 20. As will be seen the collar 14 is of a type shown in the '384 patent to Nordyke and is adapted to be swaged into lock grooves 22 in a lock groove portion 19 on an elongated shank 23 of pin 12. In the form of the invention shown in FIG. 1, the lock grooves 22 are in the form of a continuous helical thread.

The collar 14 has a through bore 24 defined by a first generally straight reduced diameter bore portion 26 at one end and an enlarged diameter generally straight bore portion 28 at its opposite, outer end. An intermediate bore portion 30 is generally frusto-conically shaped and inclines or tapers radially outwardly as it connects the bore portions 26 and 28. The collar 14 has a generally uniform wall thickness. Thus the outer surface 32 of collar 14 is generally straight at its inner end and is generally frusto-conically shaped over the radially inclined intermediate bore portion 30.

In some constructions the hold-off washer 20 may be eliminated and in others the collar 14 may be formed with an enlarged flange in place of such hold-off washer. As will be seen one advantage of using a separate hold-off washer 20 is that the washer 20 can be selected to be of one material and hardness to facilitate hold-off and to resist bearing loads and deformation while the collar 14 can be selected of a different material and hardness to facilitate swaging in lock grooves 22.

The outer tapered surface of collar 14 continues its inclination generally at the same angle over the majority of the surface towards the opposite, outer end portion of collar 14. The outer surface of the outer end portion terminates in a stand-off chamfer 34. The magnitude of radially compressive force applied by a swage anvil of an installation tool in swaging the collar 14 onto pin 12 is determined in part by the angle of the stand-off chamfer 34, which transfers load axially and radially for a given applied force via the anvil. The installation tool and swage anvil can be of a construction generally known in the art and hence the details thereof have been omitted for purposes of simplicity.

As noted in the Nordyke patent (supra) the wall thickness at the outer end of the conical portion of the collar 14 generally increases slightly in thickness to a maximum thickness at the intersection with stand-off chamfer 34. This increase in wall thickness provides an additional volume of material which compensates for the collar material which is forwardly extruded in swage and hence provides for a more uniform fill of the pin lock grooves 22 throughout the length of the swaged portion of collar 14.

Thus the collar 14 because of the radially outwardly tapered or conical shape of its shank will provide the desired stand-off but in addition, because of its generally uniform wall thickness, will provide a generally uniform fill of the lock grooves 22 of pin 12 without excessive necking of the pin 12 and hence with minimal distortion of the lock grooves 22.

The collar 14 is provided with a limited female thread 36 located in the straight bore portion 26 at the inner end of collar 14. The limited female thread 36 is adapted to threadably engage the threaded lock groove portion 19 of pin 12 to hold the components of fastener 10 together in the assembled relationship as shown in FIG. 1.

The pin member 12 has an enlarged head 37 at one end of pin shank 23. The pin shank 23 has a relatively smooth portion 38 leading to the threaded lock groove portion 19; a reduced diameter pintail portion 40 is formed with a plurality of pull grooves 44 and is connected to lock groove portion 19 via a breakneck groove 42. The annular breakneck groove 42 is of a reduced cross-sectional area which is designed to fracture at a predetermined axial load.

The secondary or main sleeve 18 has a straight shank portion 46 of generally constant outside diameter D and a tapered nose portion 48 at its inner end. In one form of the invention the tapered nose portion 48 is preferably formed with an angle A of between around 12° to around 17° with a line parallel with the axis X of the fastener 10, see FIG. 1B.

The shank portion 46 of secondary sleeve 18 extends through aligned openings 50 and 52 in a pair of workpieces 54 and 56, respectively, with the outer surface 51 of workpiece 56 engaged by the hold-off washer 20. The outside diameter D of shank portion 46 of secondary sleeve 18 is selected to fit through the aligned openings 50 and 52 with a clearance fit. In this regard the diameter of pin head 37 and the outside diameter of the expandable primary sleeve 16 are generally the same, i.e. diameter D, such that each can also be accepted through the openings 50 and 52 in a clearance relationship. The expandable, primary sleeve 16 is of a generally tubular shape having a generally uniform inside and outside diameter.

In order to set the fastener 10, a relative axial force is exerted by an installation tool between the pin member 12 and relative to the collar 14, secondary sleeve 18 and expandable primary sleeve 16. As the relative axial force is thus applied, the expandable, primary sleeve 16, which is located on the pin shank 23 adjacent the pin head 37, will be moved axially relative to the secondary sleeve 18 and into engagement with the blind side surface 60.

The free end 58 of expandable sleeve 16 engages the tapered nose 48 on secondary sleeve 18. The inside diameter of sleeve 16 has a chamfer 59 at free end 58 at an angle substantially the same as that of nose portion 48. The chamfer 59 is slight, however, reducing the wall thickness at free end 58 by no more than around 25%. In this regard chamfer 59 is provided at both ends of the sleeve 16 whereby either end can serve as the free end 58 thereby simplifying assembly. Thus as sleeve 16 moves axially it overengages the surface of the tapered nose 48 and is radially expanded. As the relative axial force increases and the pin 12 begins to move axially through the collar 14, the limited collar thread 36 will shear or deform sufficiently to permit the pin 12 to move freely through the collar 14. In this condition, however, the swaging or deformation of the material of the collar 14 into the pin lock grooves 22 has not yet started and, hence, the pin 12 and collar 14 can now respond as a typical swage type fastener. The expandable primary sleeve 16 continues to move axially and expand radially over the blind end of straight shank portion 46 until its free end 58 engages the blind side surface 60 of workpiece 54. This engagement, in a sense, defines a stop surface. At the same time the now expanded end 58 of the expandable sleeve 16 defines a blind head 62.

Figure 1A:
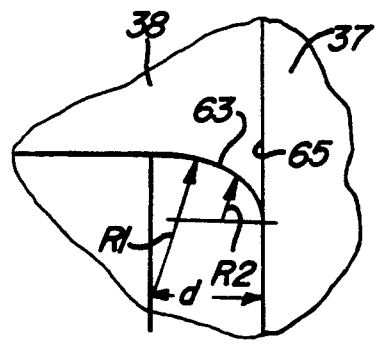
FIG. 1A is a fragmentary view to increased scale of a portion of the pin of FIG. 1 taken generally in the area of the circle 1A in FIG. 1.
Figure 2:
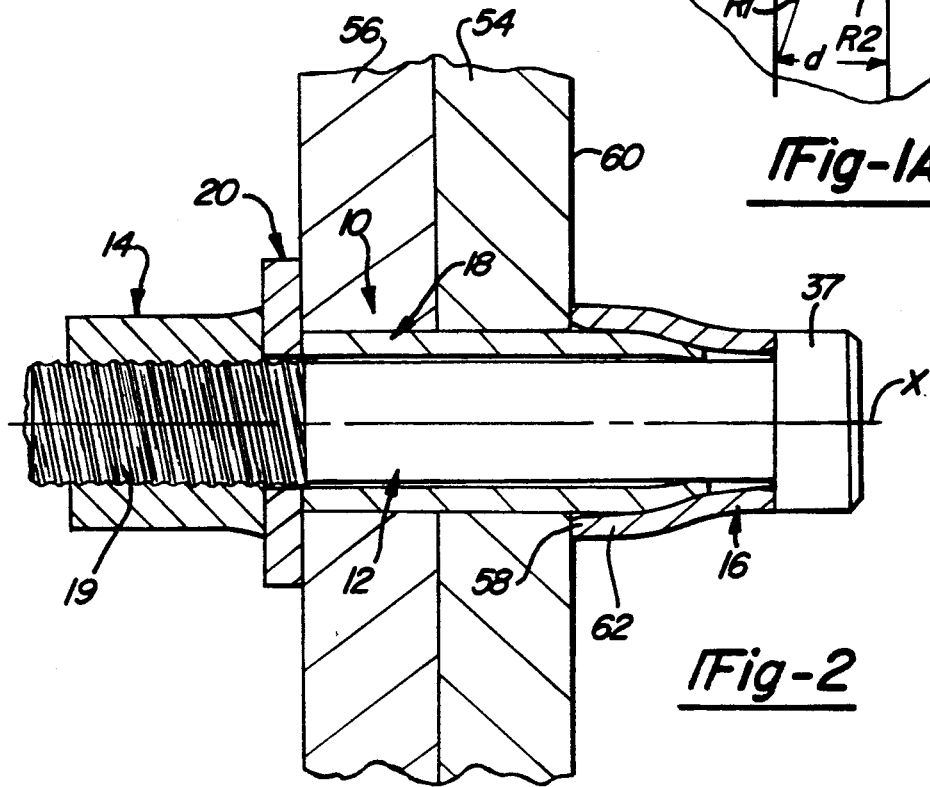
FIG. 2 is a view similar to FIG. 1 showing the blind fastener after the blind head has been formed and the fastener set.
Figure 1B:
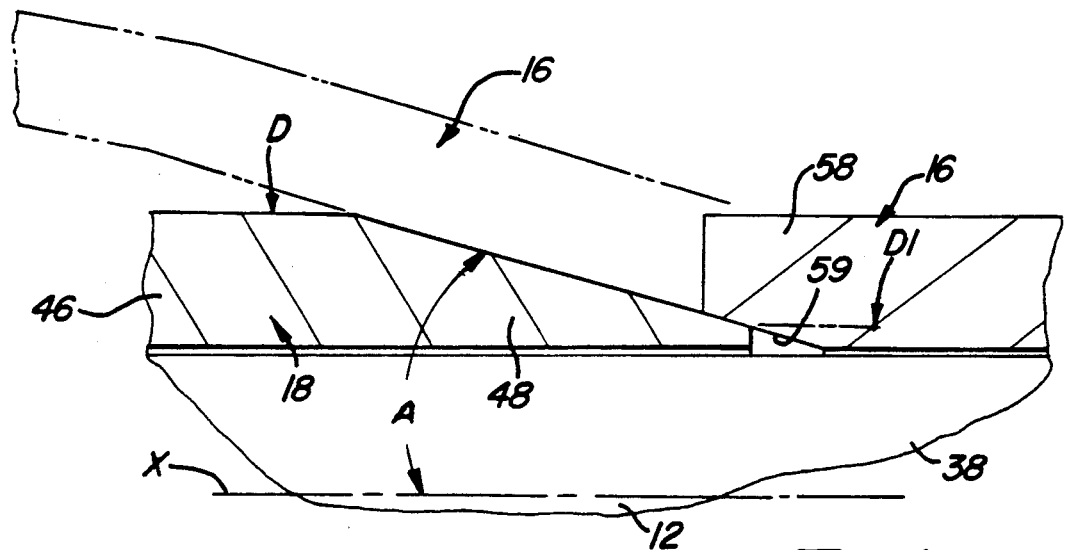
FIG. 1B is a fragmentary view to increased scale of the mating portions of the expansion sleeve and main sleeve generally in the circle 1B in FIG. 1 and further depicting in phantom the expansion sleeve as it has initially expanded radially and begins to move over the associated end of the main sleeve.

FIG. 1B depicts in phantom the shape of expandable sleeve 16 as it overengages the tapered nose portion 48 of main sleeve 18. It can be seen from FIGS. 1B and 2 that the free end 58 while initially being flared radially outwardly (see FIG. 1B) will return radially inwardly as it subsequently moves axially over the straight shank portion 46 of main sleeve 18 and into engagement with the blind side surface 60. In this regard it is desirable that the blind head 62 be finally formed with the free end 58 extending generally parallel to the axis X of the fastener 10 as shown in FIG. 2. A large bell shaped or conical configuration would locate the free end 58 radially away from the main sleeve 18 in an orientation which is non-parallel to the axis X; thus such a blind head would have less resistance to column loading and hence its load capacity would be reduced. To a great extent the formation of the blind head 62 to the desired parallel construction shown in FIG. 2 is dictated by the magnitude of the angle A of nose portion 48. The larger the angle A the more the outer end 58 will be flared radially outwardly as it moves over the nose portion 48. This could require a greater blind side distance B (FIG. 1) before the outer end 58 could move sufficiently radially inwardly to assume the desired parallel orientation with axis X. Thus the shallower or smaller then angle A the less the outer end 58 will be flared and the more readily will it be moved radially inwardly to the desired position. In this regard an angle A of between around 12° to around 17° was found desirable. While such a shallow angle A may appear to require a greater blind side clearance B than a larger angle A of a shorter length, the distance required for the free end 58 of expandable sleeve 16 to move radially inwardly to the desired parallel position is less and can more than compensate for the larger angle A of shorter length. Thus a range of angle A of between around 12° to around 14° would be preferable.

As previously noted a principle objective of the present invention is to provide a blind fastener having very high strength characteristics not present in any other blind fastener to be used in applications in which conventional high strength bolts have been used. In addition to providing a blind head 62 which geometrically has a high resistance to column buckling, the materials of the fastener 10 are selected to be of high strength and hence high hardness. Thus in one form of the invention the expandable, primary sleeve 16 can be made of a relatively high strength, ductile material such as a 4130 steel of aircraft quality having a Rockwell hardness of between around 28 Rc to around 32 Rc. In addition it has been found advantageous to utilize 4130 aircraft quality steel having a nickel content greater than around 0.17% by weight; the related specification for the 4130 aircraft quality steel provides for a maximum nickel content of 0.25% by weight. It appears that the additional nickel sufficiently improves the ductility of the expandable sleeve 16 such that axial splitting of the sleeve wall from radial expansion and from high hoop stresses in installation is inhibited. In this regard with a fastener 10 with expandable sleeve 16 constructed of the materials noted and having a sleeve diameter D of around 0.685 inches, the wall thickness t was around 0.102 inches to assure that the blind head 62 was of adequate strength; in the metric system the noted dimensions would generally apply to a 16 millimeter fastener.

It should also be noted that the expandable sleeve 16, which is constructed of a high strength material, will resist yielding radially and, while experiencing some permanent deformation, will be urged radially inwardly by the hoop stress developed from radial expansion towards the desired parallel shape of blind head 62. In this regard the use of the more shallow nose angle A of tapered nose portion 48 assists in reducing the magnitude of undesirable radially outward expansion of the free end 58 of expandable sleeve 16.

Along these same lines, with the noted construction, the free end 58 of expandable sleeve 16 will return to the desired parallel shape within a minimum axial distance after its expansion by tapered nose portion 48. This result is attained because of the high hardness and hence high yield point of the expandable sleeve 16 and the relatively shallow nose angle of nose portion 48. With this construction the fastener of the present invention can have a substantially greater functioning grip range than similar type fasteners utilizing larger angles on the tapered portion of the main sleeve and/or materials of lower hardness, lower yield point and/or lower strength. In this regard the "grip range" of a fastener is defined by the difference between the minimum and maximum total thickness of workpieces that a single fastener can secure together. The fastener of the present invention will be capable of delivering rated values, i.e. tensile, clamp load, etc., within this larger grip range.

The strength of the pin member 12 is very significant and hence the pin member 12 can be constructed of a ferrous or other material having a Rockwell hardness of between around 38 Rc to around 42 Rc or higher such as a 4130 steel of aircraft quality. At the same time the collar 14 can be constructed of a ferrous or other material such as a 1008, 1010, or 1018 low carbon steel having a Rockwell hardness of between around 68 Rb to around 78 Rb. The secondary or main sleeve 18 can be constructed of a ferrous or other material such as a 4130 steel having a Rockwell hardness of between around 43 Rc to around 47 Rc. The hold-off washer 20 can be constructed of a ferrous or other material such as a high carbon steel having a Rockwell hardness of between around 40 Rc to around 45 Rc. The washer 20 is thus harder than the collar 14 and generally of equal hardness to the secondary sleeve 18 and hence can effectively resist the extrusion of one into the other. In one form of the invention the washer 20 had a thickness of around 0.100 inches where the secondary sleeve 18 had an outside diameter D of around 0.685 inches with the expandable sleeve 16 having the dimensions previously noted.

As noted one of the advantages of the use of small or shallow angles for nose angle A is a comparative reduction in blind side clearance B (see FIG. 1) resulting in part from a reduction in the blindside protrusion of the end of the nose 48 of main sleeve 18 from blind side surface 60 which is required to properly form the blind head 62 to the desired parallelism. In addition with the present invention the grip range of the fastener will be greater with the shallower angles for nose angle A. All of the above can be accomplished while still meeting the desired strength characteristics for the fastener 10.

Thus a comparative analysis of the fastener 10 constructed of the sizes and materials noted above provided the following results for different nose angles A, with the dimensions being in inches.

| COMPARATIVE ANALYSIS | | | | |
|---|---|---|---|---|
| Nose Angle A | S | K | BL Blindside Protrusion | Grip Range |
| 20° | .236 | .233 | .469 | .125 |
| 17° | .147 | .278 | .425 | .197 |
| 12° | 0 | .399 | .399 | .393 |

The differences in blind side protrusion for fasteners of the above chart are illustrated in FIGS. 16A–C for fasteners having nose angles of 12°, 17° and 20°, respectively. In addition the differences in grip range for fasteners of the above chart having nose angles A of 12°, 17° and 20° are illustrated in FIGS. 17A–C, respectively.

Thus looking now to FIGS. 16A–C, the length S is the distance from the blind side surface 60 to the inner or large end of the taper of the nose portion 48 for workpieces having the maximum total thickness or maximum grip condition for the fastener. The distance K is the axial length of the nose portion 48. The distance BL is the length of the blind side protrusion of the nose 48 of main sleeve 18 of fastener 10 in the maximum grip condition. The above analysis was determined with a main sleeve, such as sleeve 18, with the free end of the nose portion 48 of each main sleeve having the same outside diameter D1 (see FIGS. 1B and 16A–C) and hence each main sleeve having the same minimum wall thickness at the free end.

Looking now to FIGS. 16A–C, it can be seen that with nose angle A of 12° the taper of the nose portion 48 can terminate substantially at the blind side surface 60 and still provide a blind head 62 with sufficient parallelism to provide adequate strength characteristics.

By contrast note the significant length S required for the larger nose angle of 20° to provide a blind head 62 with sufficient parallelism to provide adequate characteristics. Thus with the shallower angle A the required blind side clearance can be minimized. In addition it can be seen that the nose angle A of 20° will provide a larger cone or bell shape thus further weakening the blind head 60. These factors will also have an affect on the grip range of the fastener.

The grip range is the difference between the maximum total thickness and minimum total thickness of workpieces that can be secured together by a common fastener. As indicated on the Comparative Analysis chart, the blind bolt with the shallower nose angle A will have a greater grip range. Note in this regard that with the nose angle A of 20° the free end 58 of the blind head 62 after achieving parallelism will begin to move radially inwardly resulting in a weak, bowed configuration and hence limiting its grip range. Looking now to FIGS. 17A–C it can be seen that nose angle A of 20° will provide a substantially shorter grip range capability than the fastener with a nose angle A of around 12° and to around 17° and/or a preferred range of around 12° to around 14°. In FIGS. 17A–C the expansion sleeve 16 is shown relative to the main sleeve 18 for both the minimum grip condition and maximum grip condition with the expansion sleeve 16 depicted in the minimum grip condition on the right and in the maximum grip condition on the left. The fastener 10 with main sleeve 18 having an angle A of 12° on tapered nose portion 48 has a grip range three times that of the same fastener with main sleeve 18 having an angle A of 20° on tapered nose portion 48. Thus the fastener 10 with a main sleeve 18 having a nose angle A of 12° has a significantly greater grip range capability than a main sleeve 18 having a nose angle A greater than 17°. This can be seen by the results for a main sleeve 18 having a nose angle A of around 20°.

Thus it can also be seen that the fastener 10 with nose angle A of between around 12° to around 17° will provide a number of significant advantages over a fastener 10 with a nose angle A of 20° and greater. As noted even within the desired range of around 12° to around 17° the nose angle A can be selected to emphasize certain ones of the advantages previously discussed.

With the use of high strength, high hardness materials stress corrosion and stress concentrations can be factors in the load capability and overall performance of the fastener. Thus it is desirable to minimize the incidents of stress corrosion by protecting the highly stressed portions of the fastener from the environment; at the same time it is desirable to minimize stress concentrations at high load areas.

Thus the fastener of the present invention is of a construction which provides substantially 100% sealing of the highly stressed internal portions from the atmosphere to thereby inhibit corrosion. In this regard it has been found advantageous that the expandable sleeve 16 deform the nose portion 48 radially inwardly to tightly engage the smooth pin shank portion 38. This provides a good seal between the main sleeve 18 and pin 12 inhibiting moisture and/or contaminates from reaching the pin 12 thus inhibiting stress corrosion. At the same time the captured end of the softer expandable sleeve 16 will deform and wedge under the harder pin head 37 to provide a good seal therebetween. In addition the soft collar 14 after swaging will provide a good seal with the shallow lock grooves 22 of the harder pin member 12 while the engaging surfaces of the main sleeve 18 and washer 20 will also provide a good seal. In this regard the components of fastener 10 can be zinc plated or otherwise coated to further inhibit corrosion.

Thus as can be seen in FIG. 2 the nose portion 48, with an angle A of between around 12° to around 17° of main sleeve 18, is deformed radially inwardly by the expandable sleeve 16 into engagement with the smooth shank portion 38 of pin 12 to provide the noted sealing effect. This could result in increased friction and higher installation loads as the pin 12 moves through the collapsed section of the nose portion 48. In order to avoid excessive friction resulting from such engagement, the minimum wall thickness at the termination of the outer end 58 of nose portion 48 is selected to be no less than around 17% of the wall thickness of straight shank portion 18. At the same time a dry film lubricant such as molydisulphide is used to reduce friction between the moving parts. A molydisulphide such as Ecoa Lub 642 by Everlube has been found satisfactory.

As noted, in addition to inhibiting stress corrosion, it is desirable to reduce the stress concentrations such as that at the juncture between the inner surface 65 of the pin head 37 and smooth shank portion 38. This is accomplished by providing a generally streamlined shape to the fillet 63 located at that juncture. Such a streamlined shape is approximated by utilizing a double radius of R1 and R2 (see FIG. 1A). The larger radius R1 is generally tangent to the shank portion 38 and is around twice the radius R2 which is generally tangent to the pin head 37. For a pin 12 having a pin shank portion 38 with a diameter of around 0.450 inches and a pin head 37 having an outside diameter of around 0.685 inches a radius R1 of 0.102 inches and a radius R2 of 0.050 inches was found satisfactory in reducing the stress concentration ratio at fillet 63. In this context the fillet 63 extended for an axial distance d of around 0.080 inches.

It should also be noted that the slight chamfers 59 on the inside diameter at the opposite ends of expandable sleeve 16 plus its inner radial clearance with the smooth pin shank portion 38 assures that the confronting end of expandable sleeve 16 will not engage the fillet 63.

In addition to the reduction of the stress concentration at fillet 63, as noted, the lock grooves 22 are formed to be generally shallow in depth and to have roots of the generally streamlined contour as disclosed in the '327 application of Dixon previously discussed. With this root construction, the stress concentration at the lock grooves 22 is also reduced.

As noted, the enlarged diameter outer portion of tapered collar 14 will provide stand-off resistance to initial swage, i.e. primary clinch. The interaction of the swage surface of the swage anvil and the angle of the stand-off chamfer 34 are such as to assist in providing a preselected stand-off whereby initiation of swaging of the collar 14 into the lock grooves 22 will not begin until that lower magnitude of relative axial force has been attained which is sufficient to form the blind head 62.

As noted in the Dixon application, the pin grooves 22 can be of a shallow helical construction with a generally streamlined shape whereby a high strength construction can be achieved having a desirable high clamp load. With the noted shallow groove structure, the volume of the shank 32 of the collar 14 was selected to generally provide 'overpacking', i.e., a volume of material to provide substantially more volume of collar material for filling pin grooves 22 than is available within the swage envelope defined by the cavity of the swage anvil and the confronting lock grooves 22. In that construction, it has been found desirable to provide a volume of collar material which has an excess of at least around 14% to around 16%.

To enhance the strength of fastener 10 the pin grooves 22 and adjacent pin shoulders and the complementary grooves and shoulders of the swaged collar 14 can be proportioned in width relative to the respective shear strengths of the materials of pin 12 and collar 14, such that both the shoulders defined by pin grooves 22 of the pin 12 and the shoulders defined by interlock grooves of the swaged collar 14 are in incipient or simultaneous failure in shear at or above the preselected minimum ultimate design tensile load on associated workpieces 54 and 56. It is preferred that the design provide for the shoulders defined by the grooves of collar 14 to fail prior to the shoulders defined by pin lock grooves 22, i.e. the shoulders of pin lock grooves 22 would fail in shear at approximately 110% of the tensile load at which the shoulders of collar 14 would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 19.

As noted it is desirable that the high strength fastener of the present invention provide a high final clamp load to the fastened joint. To achieve this result high installation loads including final pin break load at breakneck groove 42 are required from the installation tool. These loads, however, are generally absorbed by the tool and are thus not fully transmitted to the operator handling the installation tool. Thus the high load occurring at pin break at breakneck groove 42 is substantially absorbed by the tool by virtue of the fact that the swaged collar is tightly located within the swage anvil of the tool.

Thus it is important that the breakneck groove 42 not fail prematurely since this could result in undesirable shock loads being transmitted to the operator.

Figure 3:
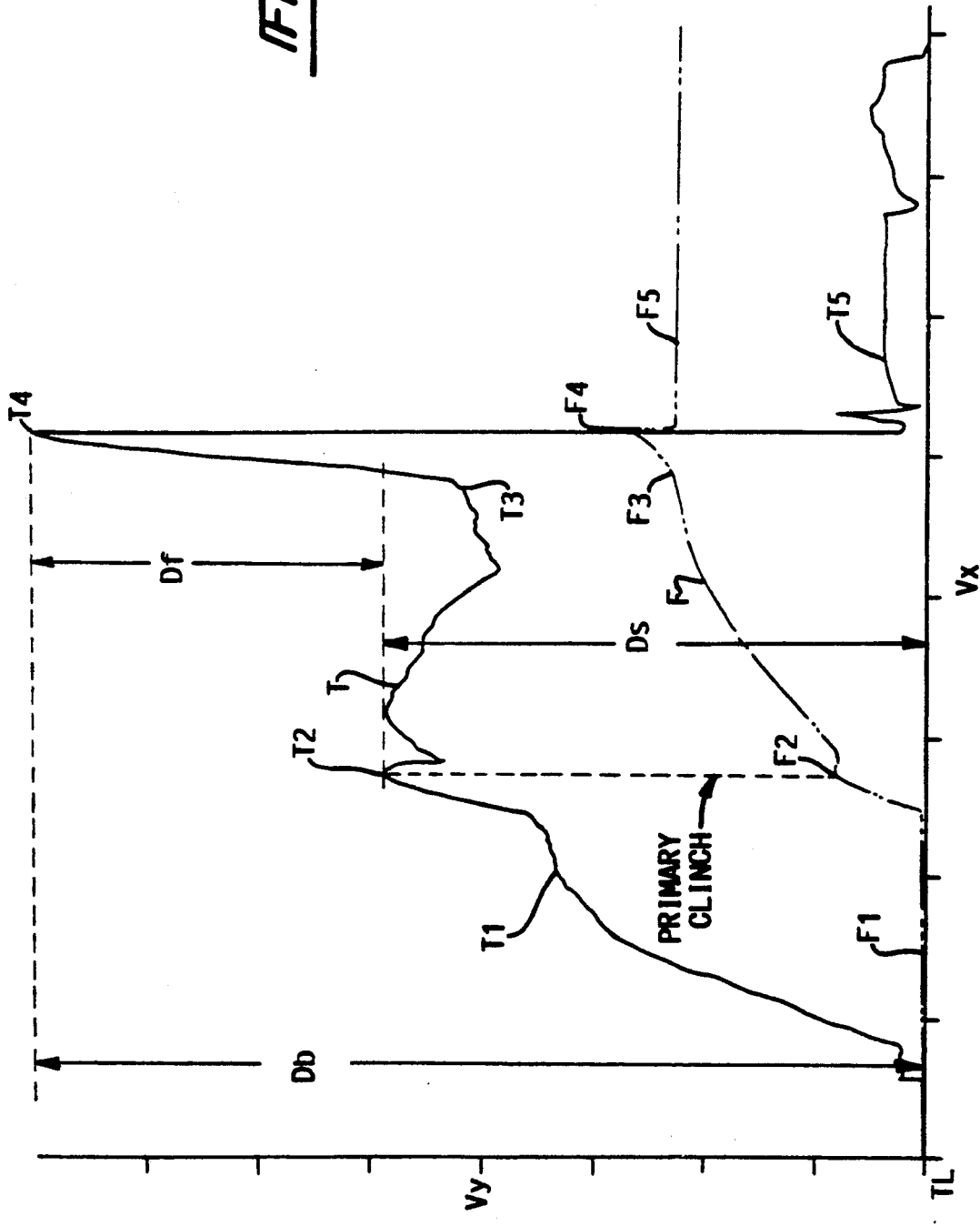
FIG. 3 is a graph depicting the hydraulic load on the tool in pounds per square inch versus time and the clamp load on the workpieces being fastened in pounds versus time both depicting the relationship between tool load and clamp load relative to the different stages of installation of a fastener of the present invention.

FIG. 3 is a graphical representation of the typical relative loads between the installation tool and the fastener, such as fastener 10, during an installation cycle. In the example used the fastener 10 had an outside diameter D of the main sleeve 18 of 0.685 inches and was generally constructed of the materials previously noted. The installation tool was of a HPT35L model tool manufactured and sold by Huck Manufacturing Company.

The curve T represents the magnitude of hydraulic pressure at the tool in pounds per square inch (Vy axis) versus time (Vx axis) in setting the fastener, such as fastener 10 for a 16 millimeter fastener as described above. In this regard the pressure curve T is also a graphical representation of the relationship of the relative axial force in pounds on the fastener 10 during the installation cycle. The curve F represents the resultant magnitude of the clamp load in pounds (Vy axis) as developed by the fastener through the installation tool during the installation cycle.

The pressure level T1 was the amount required to expand the expansion sleeve 16 over the main sleeve 18 and to initially seat it against the blind side surface 60 and thus form the blind head 62. During this portion of the installation cycle all of the relative axial force is applied substantially solely to the fastener, such as fastener 10, and not to the workpieces, such as workpieces 54, 56, and hence the clamp load F1 on the workpieces 54, 56 was substantially zero while the pressure T1 was around 2,000–3,000 psi.

After this stage, the relative axial force from the tool to the fastener 10 now begins to assert a clamp load on the workpieces 54, 56 until initial swaging or snubbing of the collar 14 into the lock grooves 22 begins resulting in "primary clinch" and a pre-load of F2 i.e. the hold-off of the collar 14 has been overcome. At the same time the hydraulic pressure to the tool has increased to a level T2. For the tool and fastener noted, the pressure T2 was around 3500–4500 psi while the pre-load F2 on the workpieces 54, 56 was around 6,000–8,000 pounds. Now with the high hold-off provided by the collar 14 overcome, the swaging of the collar 14 can continue and the relative axial force applied by the tool to continue swaging is actually reduced with a resultant pressure of T3 of around 3,250–3,750 psi. During this swaging portion of the cycle the collar 14 will elongate resulting in a substantial increase in the clamp load to a magnitude F3 of around 14,500–15,500 lbs.

Now the remaining task is to sever the pintail at the breakneck groove 42. Once again the increase in relative axial load is applied mainly to the fastener 10 and is substantially not seen by the workpieces 54, 56. The relative axial force increases via an increase in tool pressure to T4 of around 5,850 to around 7,500 psi until the breakneck groove 42 fractures to end the setting cycle. The installation tool will now reverse cycle and eject the swaged collar 14 from the tool swage anvil at a low pressure T5 to complete the installation cycle. The workpieces 54, 56 will experience a modest temporary increase in clamp load to a level F4 of between around 18,000 to around 19,000 lbs. and after pin break will settle to a final clamp load of F5 of around 12,500–13,500 lbs.

As noted, the pressure curve T4 can be considered to represent the magnitude of relative axial force applied to the fastener 10 over the installation cycle. In order to assure complete swage of the collar 14 without premature pin break at breakneck groove 42, it is desirable that the difference Df in magnitude between the magnitude of relative axial force Ds to swage the collar 14 and relative axial force Db to cause pin break at breakneck groove 42 be large in order to avoid premature pin break and the undesired shock load to the operator. In the example noted the difference Df was around 40 percent of the pin break load Db with the swage load Ds being around 60 percent of the pin break load Db. Also in order to avoid a tensile failure in the pull grooves 44 at the high relative axial setting loads encountered it was found desirable to have the root diameter of the breakneck groove 42 relative to the root diameter of the pull grooves to be in the ratio of around 0.82:1.

With the fastener 10 installed, the swaged collar 14 will have a complementary female thread formed in its through bore 24.

Figure 4:
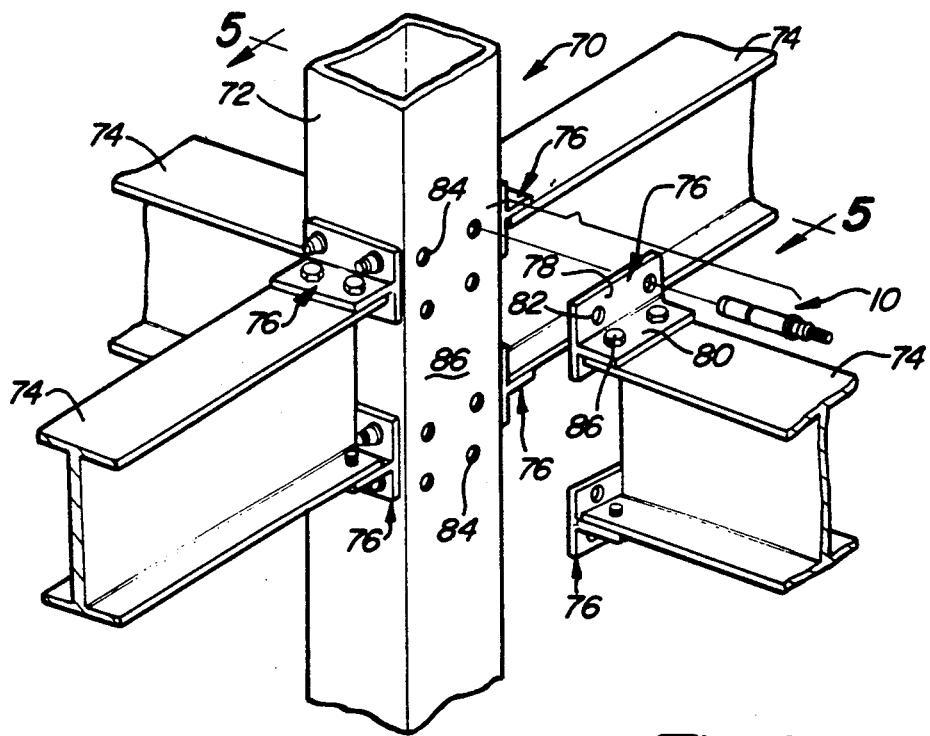
FIG. 4 is a pictorial view with some parts shown broken away and others in section depicting the blind fastener of the present invention adapted for use in a box beam/column application for securing a plurality of I-beams with one I-beam shown pre-assembled.
Figure 5:
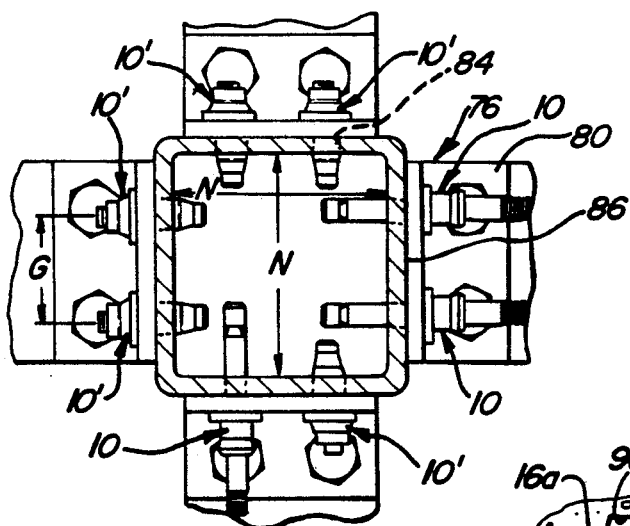
FIG. 5 is a sectional view of the structure of FIG. 4 taken generally in the direction of the arrows 5—5 in FIG. 4 but showing the one I-beam in place for assembly with some blind fasteners shown set and others shown prior to setting.

Looking now to FIGS. 4 and 5, a box beam/column construction 70 is shown and comprises a vertically mounted box beam/column 72 utilized to secure horizontally extending I-beams 74 via pairs of flanged attachment brackets 76 adapted to be secured to the box beam/column 72 by fasteners of the present invention.

With prior constructions, joints such as that shown in FIGS. 4 and 5 have required relative complex procedures and/or fastening structures such as blind welding, nut plates, and the like. With the present invention a simpler yet effective attachment structure can be used.

Thus each of the flanged attachment brackets 76 is generally T-shaped and has a base portion 78 and a central leg portion 80 extending transversely therefrom. The base portion 78 can be provided with a plurality of bores 82 adapted to match a similar plurality of bores 84 in the adjacent wall portion 86 of the box beam/column 72. The I-beam 74 is located between the central leg portions 78 of a cooperating pair of brackets 76 and secured thereto by a plurality of fasteners 86 which can be threaded fasteners or other type of non-blind fastener. Now the blind fastener 10 of FIG. 1 is applied between the base portion 78 of bracket 76 and the wall portion 86 to secure the two elements together.

It should be noted that the box beam/column 72 can be of a standard construction having standard dimensions such that the internal distance N between walls 86 will be around 5.9 inches or around 150 millimeters. At the same time the distance G between the center lines of the receiving holes 84 will be around 3.15 inches or 80 millimeters. This will then provide a limit on the blind side clearance between fasteners 10 where two or more I-beams 74 or other structures are to be attached to the box beam/column 72 at the different side walls 86 via brackets 76. FIG. 5 is a sectional view showing four I-beams 74 with brackets 76 mounted to each. In the preset condition the blind side of the fastener 10 will extend the greatest distance into the open section inside the box beam/column 72. It is desirable in such applications that the set fastener have a minimal blind side protrusion. This is shown in FIG. 5 with the set fasteners indicated as 10' and the preset fasteners indicated as 10. Thus in the present invention it is important that the blind side clearance required for the preset fastener 10 and set fastener 10' be limited and/or minimized. This is accomplished in part at least by providing the nose portion 48 with the angle A of from around 12° to around 17°. It can be seen from the Comparative Analysis table that a fastener 10 with a nose angle of between around 12° to around 17° can be constructed to have the same grip range as or greater than one with a 20° angle and have a shorter blindside protrusion BL. Conversely, for the same grip range, the expandable sleeve 16 can be shortened providing an even greater improvement in the reduction of the overall blindside protrusion B.

Thus in FIG. 5 with the blind side protrusion of the set fastener 10' being reduced as noted the center line distance G can be maximized such that the adjacent preset fastener 10 can be inserted proximate to but in clearance relationship with the blind side of set fastener 10'. For a secondary or main sleeve 18 of diameter D of around 0.685 inches, the primary or expandable sleeve 16 can have a length L of from around 0.640 inches to around 0.660 inches and the blind side protrusion B would be between around 1.38 inches and 1.48 inches over the grip range of the fastener. Another advantage of the fastener 10 of the present invention in the application such as FIG. 5, is its ease of removability. Thus the set collar need only be cut-off and the remainder of the fastener pushed through and later replaced with a new fastener.

Figure 6:
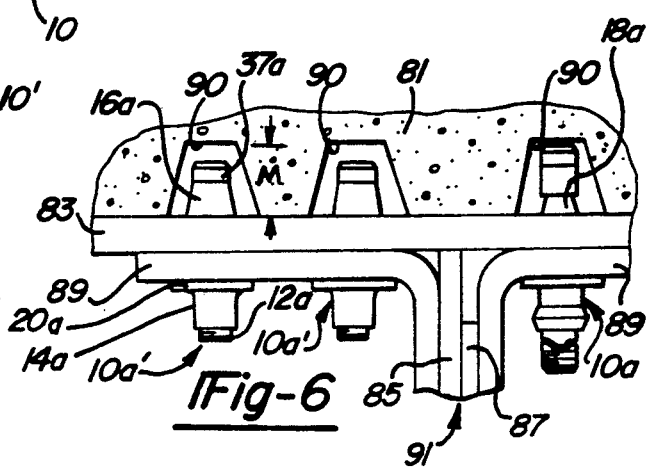
FIG. 6 is a side elevational view with some parts shown broken away and others shown in section of the present invention adapted for use in a bridge structure application.

Frequently bridges and roadways, either being newly constructed or repaired, require the attachment of beams, support brackets and the like in areas which are either generally inaccessible from one side or accessible only through relatively complex procedures. FIG. 6 illustrates a typical construction in which accessibility to one side of a structure is generally blocked. In the description of the embodiment of FIG. 6 components similar to like components in the embodiment of FIGS. 1-2 have been given the same number designation with the addition of the letter postscript "a".

Thus a concrete (or other type) road surface 81 is supported on a structure including a generally horizontal support plate 83. The support plate 83 is in turn supported by a generally T shaped vertical structure 91 defined by vertical plates 85, 87 and L-shaped brackets 89. The T-shaped structure 91 is secured to the support plate 83 by a plurality of fasteners 10a and 10a' constructed in the manner of fastener 10. The fastener 10a is shown in its pre-set condition while fasteners 10a' are shown in the set condition. Thus the fastener 10a includes a pin 12a having an enlarged pin head 37a and an expandable sleeve 16a, a main sleeve 18a, a hold-off washer 20a and a swageable collar 14a. Note that the blind side of the joint must be provided with cavities 90 which are formed by a special drilling technique with the support plate 83 in place. Here it is desirable that the depth M of the cavity 90 be maintained at a minimum. Thus the fastener 10a having a minimized blind side clearance requirement is well suited for such applications and hence the cavities 90 need be of a depth M only slightly greater than the blind side clearance B. This can be seen from the preset fastener 10a which can be configured to have the minimum blind side clearance for the maximum grip condition as shown in FIG. 16A. While conventional bolts can be used in such applications it is only by way of complex procedures by which openings are formed in the support plate 83 to permit access to the concrete or blind side of the support plate 83.

Figure 7:
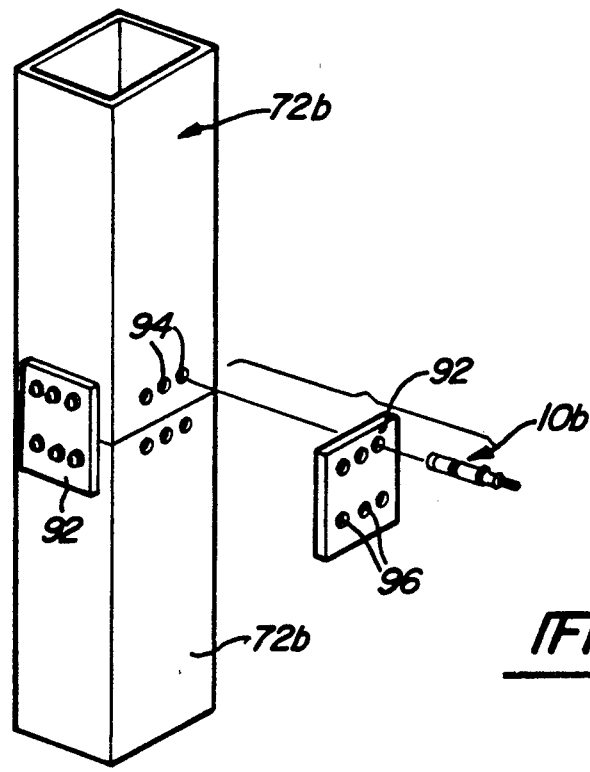
FIG. 7 is a pictorial view depicting the use of the high strength blind fastener of the present invention adapted for use in securing a pair of box beams together.

FIG. 7 depicts another box beam type construction in which the fastener of the present invention can be advantageously utilized. In the description of the embodiment of FIG. 7 components similar to like components in the embodiment of FIGS. 1-2 and 4 have been given the same number designation with the addition of the letter postscript "b".

Thus in FIG. 7 a pair of box beams 72b (similar to box beams 72 of FIG. 4) are to be secured together end-to-end by way of generally flat brackets 92. Here rows of blind fasteners 10b can be used through aligned openings 94 and 96 in the beams 72b and brackets 92 respectively to secure the beams 72b together in the end-to-end orientation shown. Other constructions would require weld nuts, nut plates, welding or other relatively complex structures and/or procedures.

Figure 8:
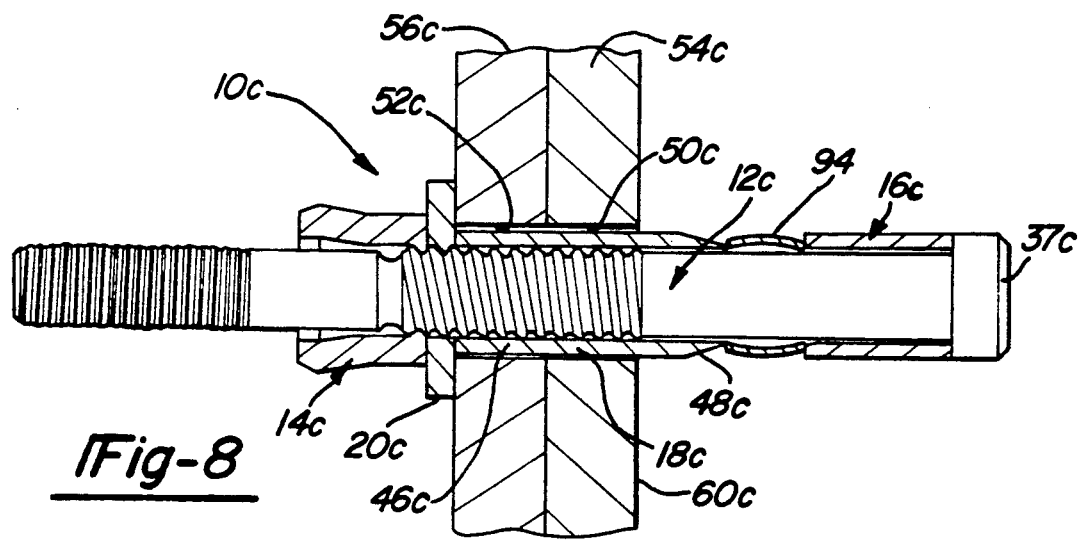
FIG. 8 is a sectional view similar to FIG. 1 of a modified form of the invention in which an additional buckling sleeve is utilized to provide a desirable bearing surface on the blind side of the workpieces being secured together.
Figure 9:
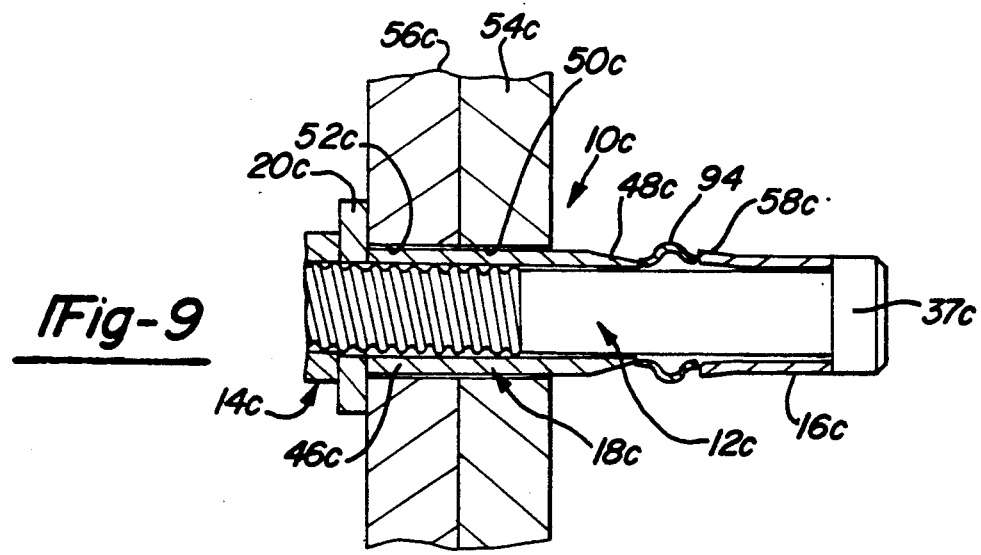
FIG. 9 is a view similar to FIG. 8 showing the modified blind fastener during its installation and before the blind head has been formed.
Figure 10:
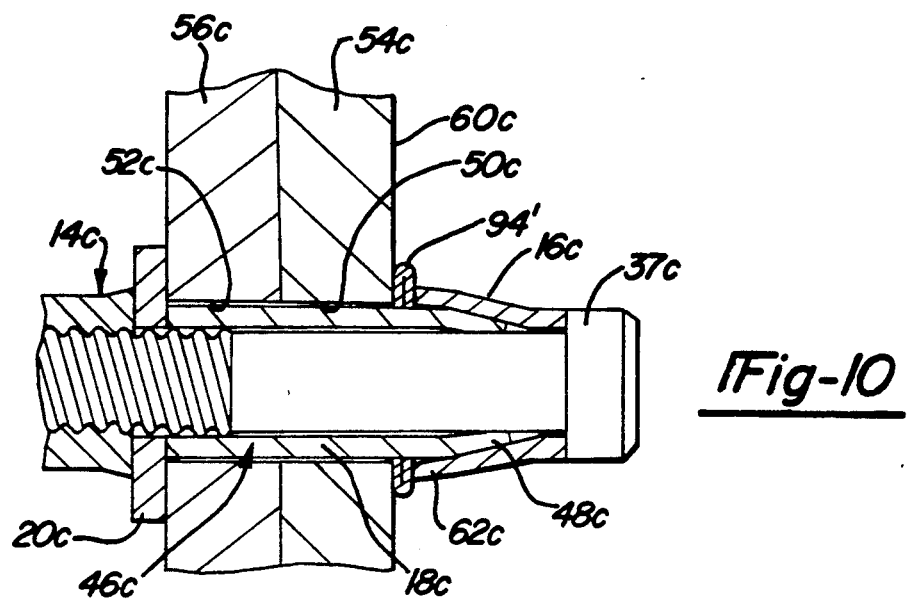
FIG. 10 is a view similar to FIG. 8 showing the modified blind fastener after the blind head has been formed and the fastener set.

There are numerous applications in which the blind side opening may be somewhat irregular and/or oversized. In such cases this could result in uneven bearing of the blind head formed by the expandable sleeve and/or possible partial extrusion of the blind head into the opening. In other situations the blind side surface could be formed of a material significantly softer than the blind head formed by the expandable sleeve and hence subject to excessive deformation. The effects of both cases can be minimized by the utilization of an intermediate sleeve adapted to readily collapse around the blind side opening and to accept the high bearing loads of the blind head. Such a construction is shown in FIGS. 8, 9 and 10. In the description of the embodiment of FIGS. 8-10 components similar to like components in the embodiment of FIGS. 1-2 have been given the same numeral designation with the addition of the letter postscript "c".

Looking now to FIGS. 8-10, a high strength blind fastener 10c includes a pin 12c, a tubular collar 14c, an expandable sleeve 16c, a main sleeve 18c and a hold-off washer 20c. The fastener 10c is located in aligned openings 50c and 52c in workpieces 54c and 56c, respectively. The noted components are substantially identical to those of fastener 10 of FIGS. 1-2. It should be noted, however, that the expandable sleeve 16c is constructed either with no chamfer, such as chamfer 59, or with a significantly reduced chamfer. This will result in a larger bearing area at the free end 58c and hence a higher strength blind head. In addition an intermediate sleeve 94 is located between the expandable sleeve 16c and the main sleeve 18c. The intermediate sleeve 94 is of a generally thin walled construction having a wall thickness generally around 8% relative to its outside diameter. As shown in FIG. 8, the intermediate sleeve 94 is preformed to be slightly curved radially outwardly midway along its length in order to facilitate buckling substantially at that center location. This is also provided to ensure that the intermediate sleeve 94 buckles before it is radially expanded over the nose portion 48c of the main sleeve 18c. In one form of the invention with the noted components constructed of the materials previously described an intermediate sleeve 94 constructed of alloy steel and having a Rockwell hardness of 80 RB was found suitable.

As shown in FIG. 9, in the first stage of the installation cycle, buckling of the intermediate sleeve 94 has started and it has not yet been radially expanded over the nose portion 48c. Note also that some radial expansion of the free end 58c of the expandable sleeve 16c may start as a result of its engagement with the intermediate sleeve 94.

FIG. 10 depicts the fastener 10c after completion of the installation cycle. Now the intermediate sleeve 94 has been completely collapsed into a flattened ring shape 94' which bears against the blind side surface 60c of workpiece 54c in close radial engagement with the outer surface of the shank portion 46c of the main sleeve 18c. The flattened ring 94' thus covers any gap existing between the outer surface of the shank portion 46c of main sleeve 18c and the blind opening 50c in workpiece 54c. At the same time the blind head 62c of expandable sleeve 16c bears against the relatively high strength material of the flattened ring 94' to provide a secure bearing surface therefore and also to insulate the blind surface 60c from the high bearing loads imposed by the blind head 62c. The axial length of the intermediate sleeve 94 is selected such that the flattened ring 94' will have an outside diameter which is around 140% of the outside diameter of the straight shank portion 46c of main sleeve 18c.

Figure 12:
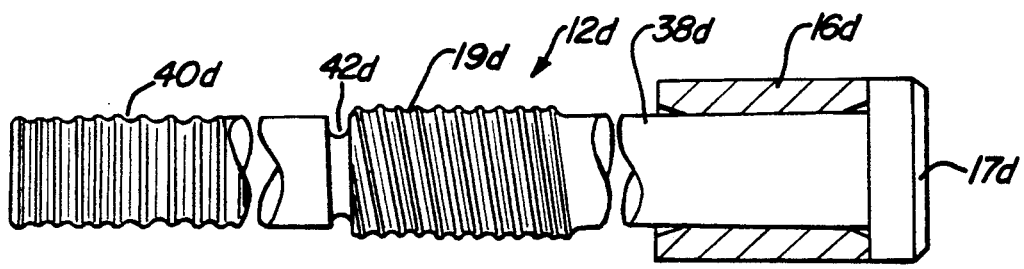
FIG. 12 is a longitudinal view of the pin and expansion sleeve after the formation of the lock grooves.
Figure 13:
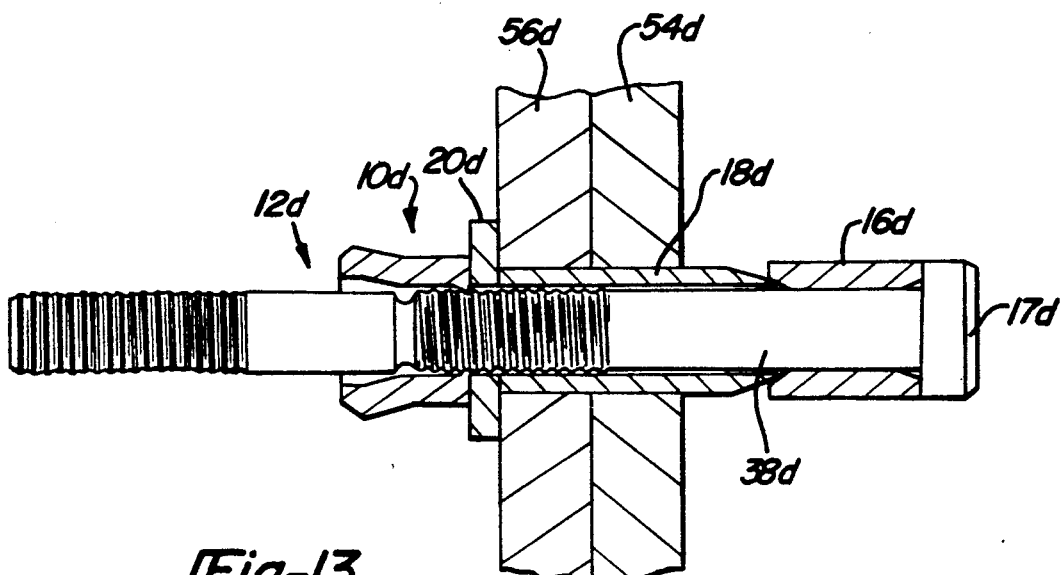
FIG. 13 is a view similar to FIG. 1 depicting another form of the blind fastener utilizing the pin and expansion sleeve of FIG. 12.

One of the factors determining the overall strength and hence load capability of the blind fastener of the present invention is the strength of the blind head. In this regard it is desirable that the wall thickness of the expandable sleeve and resultant blind head be maximized in order to provide the highest magnitude of resistance to column loading. The wall thickness, however, is directly affected by the outside diameter of the pin head and the diameter of the adjacent smooth shank portion of the pin. In the embodiment of FIG. 1, the wall thickness of the expandable sleeve 16 (and hence of resultant blind head 62) is limited by the diameter of pin head 37 and the diameter of the smooth pin shank portion 38. In the manufacturing process for the pin 12, however, the lock groove section 19 is formed by rolling from a pin blank with a shank of uniform diameter resulting in a crest diameter of the lock grooves 36 slightly larger than the diameter of the smooth pin shank portion 38. Thus for assembly purposes the inside diameter of the expandable sleeve 16 must be larger than the diameter of the smooth pin shank portion 38 in order to clear the larger crest diameter of the lock groove section 19. This results in a wall thickness of the expandable sleeve 16 which is less than maximum for the geometry of the fastener 10. This has been addressed in the embodiment of FIGS. 11-13.

In that embodiment components similar to like components in the fastener of FIGS. 1-2 have been given the same numeral designation with the addition of the letter postscript "d".

Figure 11:
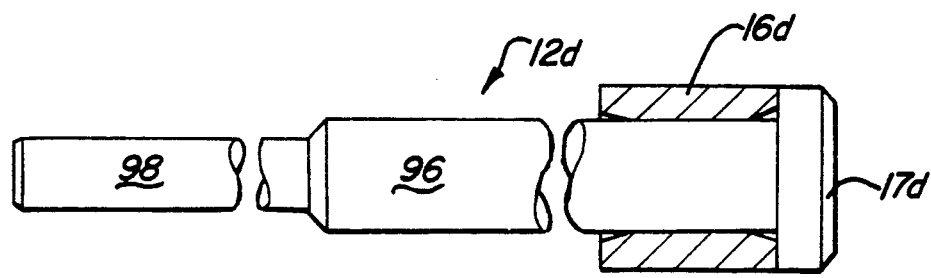
FIG. 11 is a longitudinal view with some portions shown in section of a pin blank and expansion sleeve pre-assembled prior to formation of the lock grooves on the pin.

Thus looking now to FIG. 11 the pin 12d is shown in its unfinished form and includes a stepped pin blank including a first shank portion 96 connected to a second shank portion 98 of reduced diameter. The first shank portion 96 is of the final diameter of the smooth shank portion 38d (see FIG. 12). Prior to the rolling of the lock groove section 19d, the expandable sleeve 16d is assembled onto the first shank portion 96. As with sleeve 16 of FIGS. 1-2, sleeve 16d has an outside diameter D substantially equal to the outside diameter of pin head 17d. The sleeve 16d, however, now has an inside diameter substantially the same as the diameter of what will be the smooth shank portion 38d. Thus the wall thickness of the sleeve 16d has been maximized and is greater than the wall thickness of sleeve 16 of FIGS. 1-2. Next the lock groove section 19d and pull groove section 40d are rolled and the breakneck groove 42d formed. Now the main sleeve 18d, hold-off washer 20d and collar 14d can be assembled onto the pin 12d; with the assembly completed, the fastener 10d can be utilized to secure workpieces 54d, 56d. The crest diameter of the lock groove section 19d is around 104% of the diameter of the smooth shank portion 38d. The increase in wall thickness of expandable sleeve 16d over expandable sleeve 16 will result in an increase in column strength of around 10-15%.

Figure 14:
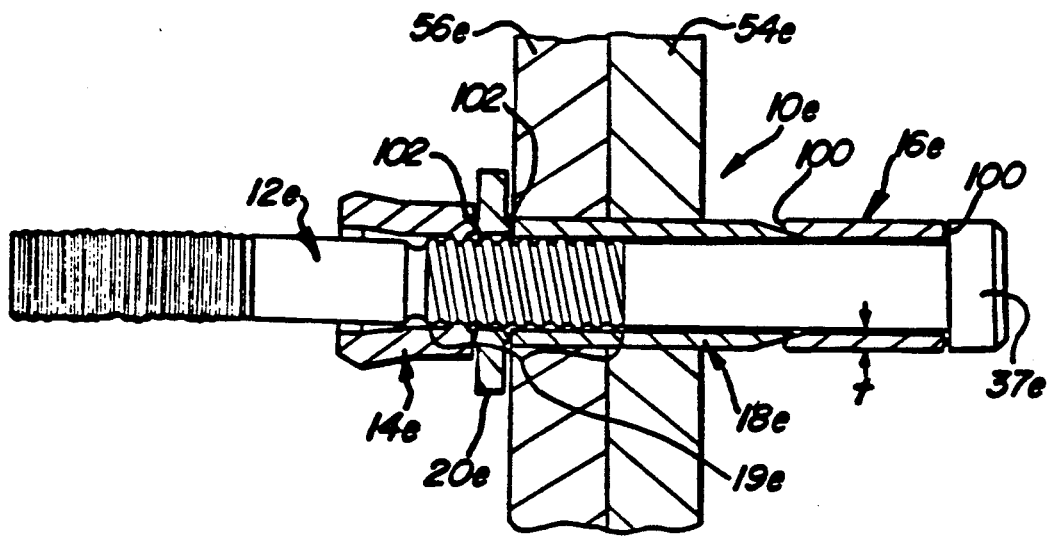
FIG. 14 is a fragmentary longitudinal view of a modified form of the fastener of FIG. 1 with a construction for enhancing the sealing of the fastener.
Figure 15:
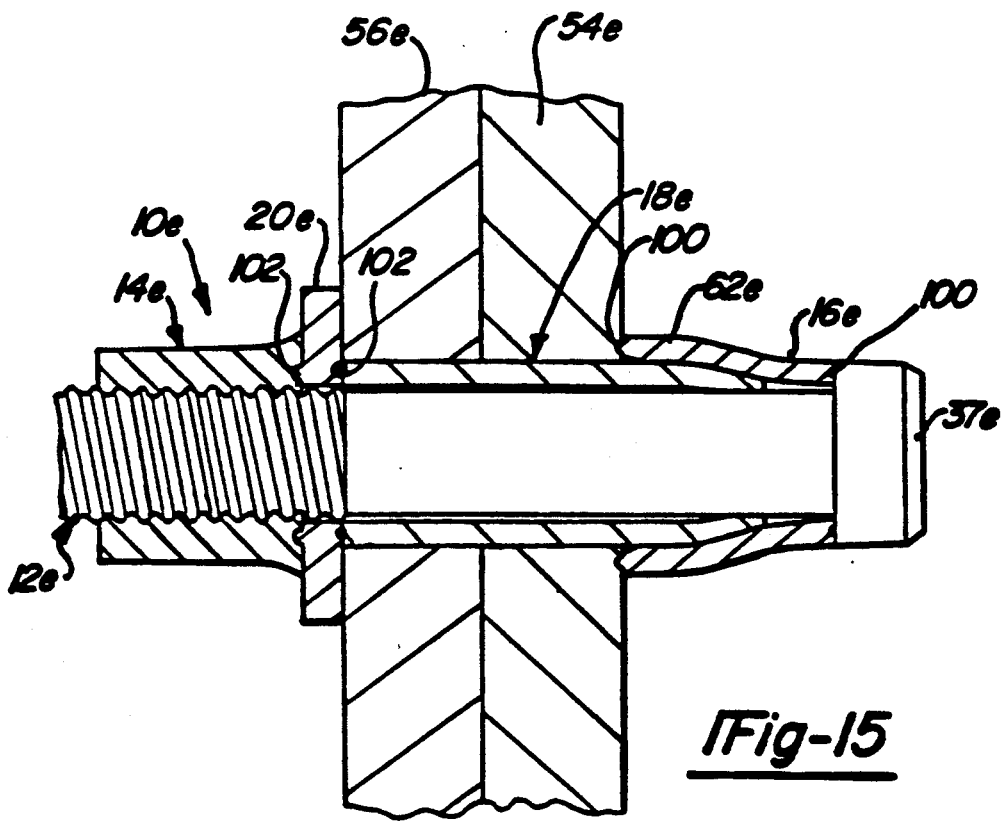
FIG. 15 is a fragmentary view depicting the fastener of FIG. 14 after the fastener has been set.

While the high strength fasteners shown in the prior embodiments will have good sealing capabilities for the reasons discussed such sealing capability can be enhanced by the embodiment shown in FIGS. 14 and 15. Thus in that embodiment components similar to like components of the fastener of FIGS. 1 and 2 have been given the same numeral designation with the addition of the postscript "e".

Thus in FIG. 14, the fastener 10e is provided with an expandable sleeve 16(e) which has an axially extending, continuous annular ridge or protrusion 100 at each end. The protrusions 100 are of substantially reduced thickness being around 10% to around 60% of the main wall thickness of the expandable sleeve 16e. For a fastener 10e having an outside diameter of the main sleeve 18e of 0.685 inches and a wall thickness t of around 0.102 inches for expandable sleeve 16e, the radial width of the protrusions 100 was between around 0.010 inches to around 0.060 inches. The axial length of the protrusions 100 was around 0.010 inches.

In the installation of the fastener 10e, as shown in FIG. 15, the protrusion 100 at the free end 58e of the expandable sleeve 16e will embed itself into the softer material of the blind side surface 60e of workpiece 54e to thereby enhance sealing engagement at that juncture. The protrusion 100 at the end opposite free end 58e will readily collapse and conform to the engaged inner surface 65e of the pin head 37e and will also enhance the sealing effect at that juncture. The provision of protrusions at both ends of the expandable sleeve 16e also provides a symmetrical construction simplifying orientation onto the pin 12e.

At the same time the hold-off washer 20e is provided with axially extending, continuous annular ridges or protrusions 102 on each side. The radial width and axial length of the protrusions 102 are generally the same as that of protrusions 100.

In the installation of the fastener 10e, FIG. 15, the outer protrusion 102 will embed itself into the confronting engaged surface of the collar 14e and the inner protrusion 102 will collapse and conform to the engaged surface of the main sleeve 18e to also enhance the sealing engagement at those junctures. The protrusions 102 are formed at identical locations on opposite sides of the hold-off washer 20e to provide a symmetrical structure thereby avoiding problems with orientation in assembly onto the pin 12e.

In addition to the above the lock groove section 19e while shown to be formed with a helical thread form can be formed with a plurality of separate annular lock grooves. This could also enhance the sealing engagement between the swaged collar 14e and lock groove section 19e.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:
   a pin member having an elongated pin shank terminating at one end in an enlarged pin head;
   said pin shank having a lock portion comprising a plurality of lock grooves and a pull portion comprising a plurality of pull grooves,
   a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis,
   an expandable sleeve member having a second through bore adapted to receive said pin shank and being located on said pin shank between said pin head and said tapered nose portion,
   a collar located on said pin shank at the accessible surface side of the workpieces and adapted to be swaged into said lock grooves in response to the relative axial force applied by the installation tool between said pin and said collar,
   said tapered nose portion defining an angle with said central axis of between around 12° and around 17°,
   said expandable sleeve moving axially relative to and expanding radially over said nose portion in response to the relative axial force to form an enlarged blind head for reacting against the blind side surface,
   said expandable sleeve member having a Rockwell hardness of between around 28 Rc to around 32 Rc,
   said main sleeve member having a Rockwell hardness of between around 43 Rc to around 47 Rc, and
   said pin member having a Rockwell hardness of between around 38 Rc to around 42 Rc, whereby a high strength blind bolt is formed.

2. The high strength blind bolt of claim 1 with said collar having a Rockwell hardness of between around 68 Rb to around 78 Rb.

3. The high strength blind bolt of claim 1 with said expandable sleeve member being constructed of an aircraft quality steel having a nickel content greater than around 0.17% by weight.

4. The high strength blind bolt of claim 1 with said expandable sleeve member being constructed of a 4130 steel having a nickel content greater than around 0.17% by weight.

5. The high strength blind bolt of claim 1 further comprising an enlarged hold-off washer located between said collar and the outer end of said main sleeve member and adapted to engage the accessible surface of the workpieces, said hold-off washer having a Rockwell hardness of between around 40 Rc to around 45 Rc.

6. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, said tapered nose portion defining an angle with said central axis of between around 12° to around 14°, said expandable sleeve moving axially relative to and expanding radially over said nose portion in response to the relative axial force to form an enlarged blind head for reacting against the blind side surface, said expandable sleeve member having a Rockwell hardness of between around 28 Rc to around 32 Rc, said main sleeve member having a Rockwell hardness of between around 43 Rc to around 47 Rc, and said pin member having a Rockwell hardness of between around 38 Rc to around 42 Rc, whereby a high strength blind bolt is formed.

7. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, an enlarged hold-off washer located between said collar and the outer end of said main sleeve member and adapted to engage the accessible surface of the workpieces, said tapered nose portion defining an angle with said central axis of between around 12° and around 14°, said expandable sleeve moving axially relative to and expanding radially over said nose portion in response to the relative axial force to form an enlarged blind head for reacting against the blind side surface, said expandable sleeve member having a Rockwell hardness of between around 28 Rc to around 32 Rc, said main sleeve member having a Rockwell hardness of between around 43 Rc to around 47 Rc, and said pin member having a Rockwell hardness of between around 38 Rc to around 42 Rc, said collar having a Rockwell hardness of between around 68 Rb to around 78 Rb, said expandable sleeve member being constructed of a steel having a nickel content greater than around 0.17% by weight, said hold-off washer having a Rockwell hardness of between around 40 Rc to around 45 Rc, whereby a high strength blind bolt is formed.

8. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, an enlarged hold-off washer located between said collar and the outer end of said main sleeve member and adapted to engage the accessible surface of the workpieces, said tapered nose portion defining an angle with said central axis of between around 12° to around 14°, said expandable sleeve moving axially relative to and expanding radially over said nose portion in response to the relative axial force to form an enlarged blind head for reacting against the blind side surface, said expandable sleeve member having a Rockwell hardness of between around 28 Rc to around 32 Rc, said main sleeve member having a Rockwell hardness of between around 43 Rc to around 47 Rc, and said pin member having a Rockwell hardness of between around 38 Rc to around 42 Rc, said collar having a Rockwell hardness of between around 68 Rb to around 78 Rb, said expandable sleeve member being constructed of a steel having a nickel content greater than around 0.17% by weight, said hold-off washer having a Rockwell hardness of between around 40 Rc to around 45 Rc, whereby a high strength blind bolt is formed.

9. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, said tapered nose portion defining an angle with said central axis of between around 12° and around 17°, said expandable sleeve moving axially relative to and expanding radially over said nose portion in response to the relative axial force to form an enlarged blind head for reacting against the blind side surface, an enlarged hold-off washer located between said collar and the outer end of said main sleeve member and adapted to engage the accessible surface of the workpieces, said pin shank having a generally smooth portion extending generally from said pin head to said lock grooves, said nose portion having a preselected minimum wall thickness adapted to sealingly deform onto said smooth portion of said pin shank in response to axial movement and radial expansion of said expandable sleeve member over said nose portion, said hold-off washer sealingly engaging the adjacent ends of said collar and said main sleeve member to seal said shank of said pin member.

10. The high strength blind bolt of claim 9 with annular protrusion means operative between said hold-off washer and said collar and said main sleeve to provide the sealing engagement therebetween.

11. The high strength blind bolt of claim 9 with said expandable sleeve sealingly engaging the confronting surface of said pin head.

12. The high strength blind bolt of claim 9 with annular protrusion means operative between said hold-off washer and said collar and said main sleeve to provide the sealing engagement therebetween, said expandable sleeve sealingly engaging the confronting surface of said pin head, and second annular protrusion means operative between said expandable sleeve and said confronting surface of said pin head to provide the sealing engagement therebetween.

13. The high strength blind bolt of claim 12 with third annular protrusion means on said expandable sleeve opposite from said pin head and adapted to sealingly engage the blind side surface.

14. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, said tapered nose portion defining an angle with said central axis of between around 12° to around 14°, said expandable sleeve moving axially relative to and expanding radially over said nose portion in response to the relative axial force to form an enlarged blind head for reacting against the blind side surface, an enlarged hold-off washer located between said collar and the outer end of said main sleeve member and adapted to engage the accessible surface of the workpieces, said pin shank having a generally smooth portion extending generally from said pin head to said lock grooves, said nose portion having a preselected minimum wall thickness adapted to sealingly deform onto said smooth portion of said pin shank in response to axial movement and radial expansion of said expandable sleeve member over said nose portion, said hold-off washer sealingly engaging the adjacent ends of said collar and said main sleeve member to seal said shank of said pin member.

15. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, said tapered nose portion defining an angle with said central axis of between around 12° and around 17°, said expandable sleeve moving axially relative to and expanding radially over said nose portion in response to the relative axial force to form an enlarged blind head for reacting against the blind side surface, said pin shank having a generally smooth portion extending generally from said pin head to said lock grooves, said pin head connected to said smooth shank by a streamlined fillet generally defined by a first radius which is generally tangent to said smooth shank and a second radius which is generally tangent to the inner surface of said pin head, said first radius being around twice the magnitude of said second radius.

16. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force applied by the installation tool between said pin and said collar, said tapered nose portion defining an angle with said central axis of between around 12° to around 14°, said expandable sleeve moving axially relative to and expanding radially over said nose portion in response to the relative axial force to form an enlarged blind head for reacting against the blind side surface, said pin shank having a generally smooth portion extending generally from said pin head to said lock grooves, said pin head connected to said smooth shank by a streamlined fillet generally defined by a first radius which is generally tangent to said smooth surface and a second radius which is generally tangent to the inner surface of said pin head, said first radius being around twice the magnitude of said second radius.

17. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, said pin shank having a gripping portion adapted to be engaged by the installation tool, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be moved into engagement with said securing grooves, said engaging member adapted to be engaged by the installation tool whereby a relative axial force can be applied by the installation tool between said pin and said engaging member to clamp the workpieces together at a relative axial force of a first magnitude, said tapered nose portion defining an angle with said central axis of between around 12° and around 17°, said expandable sleeve moving axially relative to and expanding radially over said nose portion in response to a second magnitude of relative axial force to form an enlarged blind head for reacting against the blind side surface, said second magnitude of relative axial force being less than said first magnitude of relative axial force, said expandable sleeve member having a Rockwell hardness of between around 28 Rc to around 32 Rc, said main sleeve member having a Rockwell hardness of between around 43 Rc to around 47 Rc, and said pin member having a Rockwell hardness of between around 38 Rc to around 42 Rc, whereby a high strength blind bolt is formed.

18. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, said pin shank having a gripping portion adapted to be engaged by the installation tool, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be moved into engagement with said securing grooves, said engaging member adapted to be engaged by the installation tool whereby a relative axial force can be applied by the installation tool between said pin and said engaging member to clamp the workpieces together at a relative axial force of a first magnitude, an enlarged hold-off washer located between said engaging member and the outer end of said main sleeve member and adapted to engage the accessible surface of the workpieces, said tapered nose portion defining an angle with said central axis of between around 12° and around 17°, said expandable sleeve moving axially relative to and expanding radially over said nose portion in response to a second magnitude of relative axial force to form an enlarged blind head for reacting against the blind side surface, said second magnitude of relative axial force being less than said first magnitude of relative axial force, said expandable sleeve member having a Rockwell hardness of between around 28 Rc to around 32 Rc, said main sleeve member having a Rockwell hardness of between around 43 Rc to around 47 Rc, and said pin member having a Rockwell hardness of between around 38 Rc to around 42 Rc, said engaging member having a Rockwell hardness of between around 68 Rb to around 78 Rb, said expandable sleeve member being constructed of a steel having a nickel content greater than around 0.17% by weight, said hold-off washer having a Rockwell hardness of between around 40 Rc to around 45 Rc, whereby a high strength blind bolt is formed.

19. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, said pin shank having a gripping portion adapted to be engaged by the installation tool, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be moved into engagement with said securing grooves, said engaging member adapted to be engaged by the installation tool whereby a relative axial force can be applied by the installation tool between said pin and said engaging member to clamp the workpieces together at a relative axial force of a first magnitude, said tapered nose portion defining an angle with said central axis of between around 12° and around 17°, said expandable sleeve moving axially relative to and expanding radially over said nose portion in response to a second magnitude of relative axial force to form an enlarged blind head for reacting against the blind side surface, said second magnitude of relative axial force being less than said first magnitude of relative axial force, an enlarged hold-off washer located between said engaging member and the outer end of said main sleeve member and adapted to engage the accessible surface of the workpieces, said pin shank having a generally smooth portion extending generally from said pin head to said securing grooves, said nose portion having a preselected minimum wall thickness adapted to sealingly deform onto said smooth portion of said pin shank in response to axial movement and radial expansion of said expandable sleeve member over said nose portion, said hold-off washer sealingly engaging the adjacent ends of said engaging member and said main sleeve member to seal said shank of said pin member.

20. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, said pin shank having a gripping portion adapted to be engaged by the installation tool, a main sleeve member having an elongated sleeve shank terminating at its inner end in a tapered nose portion, said sleeve shank adapted to be located in the aligned openings in the workpieces, said main sleeve member having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be moved into engagement with said securing grooves, said engaging member adapted to be engaged by the installation tool whereby a relative axial force can be applied by the installation tool between said pin and said engaging member to clamp the workpieces together at a relative axial force of a first magnitude, said tapered nose portion defining an angle with said central axis of between around 12° and around 17°, said expandable sleeve moving axially relative to and expanding radially over said nose portion in response to a second magnitude of relative axial force to form an enlarged blind head for reacting against the blind side surface, said second magnitude of relative axial force being less than said first magnitude of relative axial force, said pin shank having a generally smooth portion extending generally from said pin head to said securing grooves, said pin head connected to said smooth shank by a streamlined fillet generally defined by a first radius which is generally tangent to said smooth shank and a shank radius which is generally tangent to the inner surface of said pin head, said first radius being around twice the magnitude of said second radius.

* * * * *

UNITED STATES PATENT AND TRADEMARK OFFICE
CERTIFICATE OF CORRECTION

PATENT NO. : 5,178,502

DATED : January 12, 1993

INVENTOR(S) : Shahriar M. Sadri

It is certified that error appears in the above-identified patent and that said Letters Patent is hereby corrected as shown below:

On the title page, In the prior Art, Patent No. "4,363,697" should read --4,364,697--.

Column 7, line 40, delete "then" and substitute therefor --the--.

Column 24, line 24, claim 16, delete "surface" and substitute --shank--.

Column 28, line 19, claim 20, delete "shank" and substitute --second--.

Signed and Sealed this

Twenty-second Day of February, 1994

Attest:

BRUCE LEHMAN

*Attesting Officer*   *Commissioner of Patents and Trademarks*